(12) United States Patent
Xu et al.

(10) Patent No.: US 8,917,033 B2
(45) Date of Patent: Dec. 23, 2014

(54) OPEN CIRCUIT PROTECTING CIRCUIT, OPEN CIRCUIT PROTECTING METHOD AND ILLUMINATING APPARATUS

(71) Applicants: Lizhi Xu, Taoyuan Hsien (TW); Weiqiang Zhang, Taoyuan Hsien (TW); Jianping Ying, Taoyuan Hsien (TW)

(72) Inventors: Lizhi Xu, Taoyuan Hsien (TW); Weiqiang Zhang, Taoyuan Hsien (TW); Jianping Ying, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 125 days.

(21) Appl. No.: 13/688,703

(22) Filed: Nov. 29, 2012

(65) Prior Publication Data

US 2013/0307416 A1 Nov. 21, 2013

(30) Foreign Application Priority Data

May 21, 2012 (CN) .......................... 2012 1 0158367

(51) Int. Cl.
*H05B 37/02* (2006.01)
*H05B 33/08* (2006.01)
(52) U.S. Cl.
CPC .............. *H05B 37/02* (2013.01); *H05B 33/089* (2013.01); *Y02B 20/341* (2013.01)
USPC .............................. 315/306; 315/122; 315/360

(58) Field of Classification Search
USPC ............. 315/119, 125, 185 R, 192, 193, 291, 315/294, 306, 307, 312, 360
See application file for complete search history.

(56) References Cited

U.S. PATENT DOCUMENTS

| | | | |
|---|---|---|---|
| 8,552,663 B2 * | 10/2013 | Welten | 315/307 |
| 2013/0077202 A1 * | 3/2013 | Chin et al. | 361/91.5 |
| 2013/0193852 A1 * | 8/2013 | Frattini et al. | 315/122 |
| 2013/0300295 A1 * | 11/2013 | Blanchard et al. | 315/122 |
| 2013/0307424 A1 * | 11/2013 | Gray et al. | 315/193 |

* cited by examiner

*Primary Examiner* — Tung X Le
(74) *Attorney, Agent, or Firm* — Tim Tingkang Xia, Esq.; Morris, Manning & Martin, LLP (57) ABSTRACT

The present application discloses an open circuit protecting circuit, an open circuit protecting method and an illuminating apparatus. The open circuit protecting circuit is configured in an apparatus with a LED load being supplied with power by a current source, and comprises: a switch circuit, a timer circuit and a detecting circuit. When the LED load malfunctions, the open circuit protecting circuit carries out the following operations: the detecting circuit sends an enabling signal to the timer circuit, the timer circuit sends a driving signal with a set time to the switch circuit and the switch circuit is in the on-state during the set time, so as to make the LED load be short circuited to protect the circuit from being damaged. The open circuit protecting circuit can also resume to normal work automatically after the open circuited malfunction is cleared, and thus a hot-plugging function can be realized.

17 Claims, 11 Drawing Sheets

OPEN CIRCUIT PROTECTING CIRCUIT, OPEN CIRCUIT PROTECTING METHOD AND ILLUMINATING APPARATUS

CROSS REFERENCE TO RELATED APPLICATIONS

The present invention claims priority under 35 U.S.C. §119 to Chinese Patent Application No. 201210158367.7, filed on May 21, 2012, the entire content of which is incorporated herein by reference.

FIELD OF THE INVENTION

The present application relates to an open circuit protecting circuit, an open circuit protecting method and an illuminating apparatus.

BACKGROUND OF THE INVENTION

Generally, light-emitting diode (LED) loads are driven by an electric current source due to the electrical characteristics and luminescence characteristics of LED. When an electric current source is configured for supplying electric power to LED loads, and if the LED loads malfunction, for example, if one or more LED loads in a LED loads string is damaged or if the whole LED loads string is in poor contact with the circuit, the LED loads would present an open circuit state. If no protecting measure is taken under the open circuit state, the output voltage would increase rapidly, and the rest parts of the circuit would be damaged. Therefore, an open circuit protecting function is very necessary.

Figure 1:
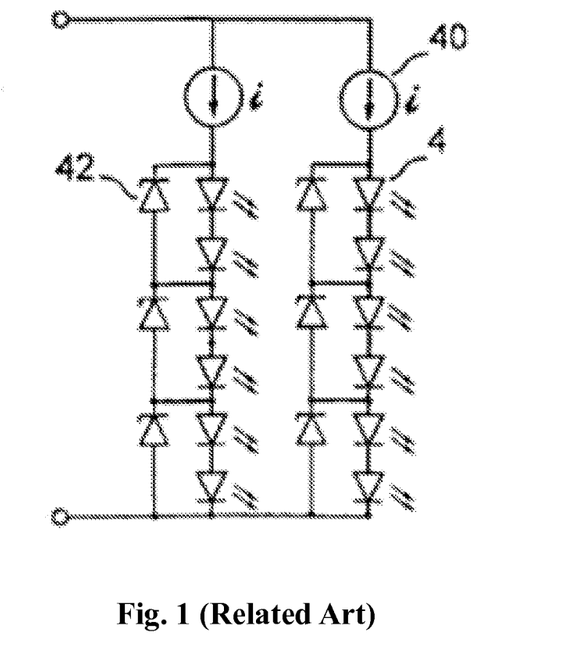
FIG. 1 is a schematic diagram of an open circuit protecting circuit in related art.

For realizing the open circuit protecting function, there have been many open circuit protecting technologies, and in one of which a zener diode is anti-parallel connected to a plurality of series-connected LED loads. As shown in FIG. 1, when no LED load is open circuited in a branch of series-connected LED loads 4, an electric current from the electric current source passes through all the series-connected LED loads 4, and no zener diode 42 would be reversely brokedown. Or else, if one LED load in the branch of series-connected LED loads 4 is open circuited because of being damaged or in poor contact with the circuit, the zener diode 42 which is anti-parallel connected to the open circuited LED load 4 would be reversely brokedown, and a large part of the electric current would flow into the zener diode 42 which is anti-parallel connected to the open circuited LED load 4, thus the whole series-connected LED loads string would not be open circuited, so as to ensure that other LED loads can operate normally. Nevertheless, this technology would cause a relatively large power cost on the zener diode 42. Moreover, because the zener diodes 42 and the LED loads string are integrated together in this technology, the rest parts of the circuit may still be damaged if many LED loads in the whole branch are all in poor contact with the circuit or if there is no LED load connected into the branch.

Figure 2:
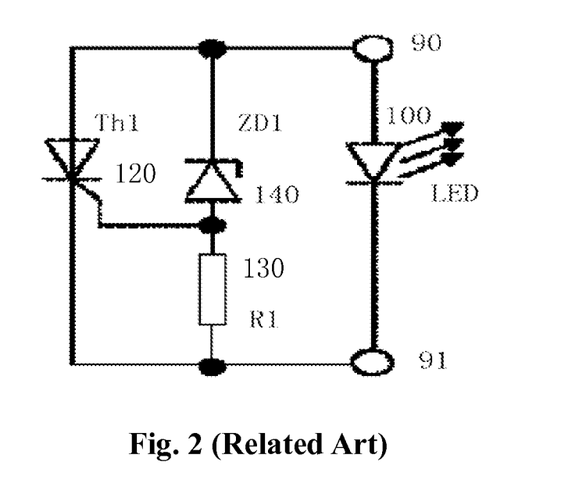
FIG. 2 is a schematic diagram of another open circuit protecting circuit in related art.

Besides, silicon controlled rectifiers (SCRs) are connected in parallel with LED loads in another technology. As shown in FIG. 2, when a LED load 100 is not open circuited, the voltage of the control terminal of a SCR 120 is lower than the "threshold" voltage thereof, so an electric current from an electric current source passes through the LED load 100, and the SCR 120 presents an "off-state". If the LED load 100 is open circuited, the voltage of the control terminal of the SCR 120 is larger than the "threshold" voltage thereof, so the SCR 120 is turned on and converted from the "off-state" to an "on-state", the electric current can pass through the SCR 120, and the LED load is short circuited, i.e., the open circuit protection is realized for the LED load. This technology can protect the circuit from being destroyed. However, the SCR can not be turned off after being turned on as it is a half-controlled device. Therefore, when the LED load on the output side resumes to a normal state, the SCR cannot resume to the normal work state automatically, i.e., the LED load cannot be provided with a function of hot-plugging.

Above all, it is an effort in the direction for those skilled in the art to solve any one problem existed in the present open circuit protecting circuits.

SUMMARY OF THE INVENTION

The present application, in part, is to provide a circuit assembly for open circuit protection, which can resume to normal work automatically after a malfunction is cleared (i.e., the hot-plugging of the LED load can be supported); or which can protect the rest parts of the circuit from damage when many LED loads in a whole branch are all in poor contact with the circuit assembly or there is no LED load connected into the branch, and which can lower the power consumption thereof.

In one aspect, it is provided a circuit (a circuit assembly) for open circuit protection, which is configured in an apparatus with a LED load supplied with an electronic current source (for example, an AC electric current source). The open circuit protecting circuit includes, but is not limited to, a switch circuit, connected in parallel with two sides of the LED load; a timer circuit, connected to the switch circuit; and a detecting circuit, connected to the timer circuit and configured to detect an open circuit condition of the LED load. When the LED load malfunctions and is open circuited accordingly, the open circuit protecting circuit carries out the following operations: the detecting circuit sends an enabling signal to the timer circuit, then the timer circuit sends a driving signal with a set time to the switch circuit, and the switch circuit is in the on-state during the set time, so that the LED load can be short circuited.

The described switch circuit has the on-state and off-states and may include one or more switch devices. It remains in the off-state until an open circuit condition is detected and switches to the on-state during a set time upon receiving a driving signal from the timer circuit. In some embodiments, the switch circuit is back to the off-state once the set time controlled by the timer circuit is up.

The described timer circuit has a signaling state with a set time. It switches to the signaling state upon receiving an enabling signal from the detecting circuit, so as to send a driving signal with a set time to the switch circuit.

The described detecting circuit has an operating state that is detective of an open circuit condition of the LED load. It detects an open circuit condition of the LED load and sends an enabling signal to the timer circuit if the LED load is detected to be open circuited.

As used herein, the term "connected" or "connect" refers to a direct or indirect connection.

In another aspect, it is provided an illuminating apparatus, which comprises: the open circuit protecting circuit as described above; and the LED load, wherein the open circuit protecting circuit is connected in parallel with two ends of the LED load.

In further another aspect according to the present application, it is provided an illuminating apparatus, which comprises: a plurality of open circuit protecting circuits as described above; and a plurality of LED loads connected in series, wherein two ends of each LED load is connected in parallel with one of the open circuit protecting circuits.

In one aspect according to the present application, it is provided an illuminating apparatus, which comprises: a first branch of LED load with a first anode and a first cathode; a second branch of LED load with a second anode and a second cathode, wherein the first and the second branch of LED load are supplied with electric power by an AC electric current source with a first end and a second end, the first cathode and the second anode are connected to the second end of the AC electric current source, the first branch of LED load works during a positive half-period of the AC electric current source, and the second branch of LED load works during a negative half-period of the AC electric current source; an open circuit protecting circuit as described above which is configured as a first open circuit protecting circuit, the first open circuit protecting circuit is connected in parallel with the first branch of LED load; an open circuit protecting circuit as described above which is configured as a second open circuit protecting circuit, the second open circuit protecting circuit is connected in parallel with the second branch of LED load; a first current equalizing capacitor with a first capacitor end and a second capacitor end, the first capacitor end is connected to the first end of the AC electric current source; a first rectifier diode with a first rectifier anode and a first rectifier cathode, the first rectifier cathode is connected to the first anode of the first branch of LED load, and the first rectifier anode is connected to the second capacitor end; and a second rectifier diode with a second rectifier anode and a second rectifier cathode, the second rectifier anode is connected to the second cathode of the second branch of LED load, and the second rectifier cathode is connected to the second capacitor end.

In still another aspect according to the present application, it is provided an open circuit protecting method for a LED load, which comprises: detecting by a detecting circuit whether the LED load is open circuited; when it is detected that the LED load malfunctions and is open circuited accordingly, sending an enabling signal to a timer circuit by the detecting circuit; sending by the timer circuit a driving signal with a set time to a switch circuit which is connected in parallel with the LED load; and making the switch circuit in the on-state during the set time, so as to make the LED load short circuited.

In an apparatus using LED loads, the open circuit protecting circuit of the present application can resume to normal work automatically after a malfunction of the LED is cleared; and can also protect the rest parts of the circuit from being damaged when many LED loads in the whole branch are all in poor contact with the circuit or there is no LED load connected into the branch, and the power consumption of the open circuit protecting circuit is relatively low.

Wherein, the reference signs are listed as follows:

| | |
|---|---|
| 4: LED load | 62: timer circuit |
| 40: electric current source | 63: detecting circuit |
| 42: zener diode | 64: supply voltage generator |
| 100: LED load | 71: LED load |
| 120: SCR | 72: LED load |
| 130: resistor | 701: open circuit protecting circuit |
| 140: zener diode | 702: open circuit protecting circuit |
| 2: LED load | 81: LED load |
| 3: open circuit protecting circuit | 82: LED load |
| 31: switch circuit | 801: open circuit protecting circuit |
| 32: timer circuit | 802: open circuit protecting circuit |
| 33: detecting circuit | 91: LED load |
| 400: LED load | 92: LED load |
| 5: open circuit protecting circuit | 93: LED load |
| 51: switch circuit | 94: LED load |
| 52: timer circuit | 901: open circuit protecting circuit |
| 53: detecting circuit | 902: open circuit protecting circuit |
| 54: supply voltage generator | 903: open circuit protecting circuit |
| 6: open circuit protecting circuit | 904: open circuit protecting circuit |
| 7: LED load | S1001~S1005: steps |
| 61: switch circuit | |

DETAILED EMBODIMENTS OF THE INVENTION

Reference will now be made in detail to the present application in connection with the accompanying drawings. It should be noticed that the detailed description set forth herein is only used to illustrate the present application, and is not used to limit the protection scope of the present application.

Figure 3:
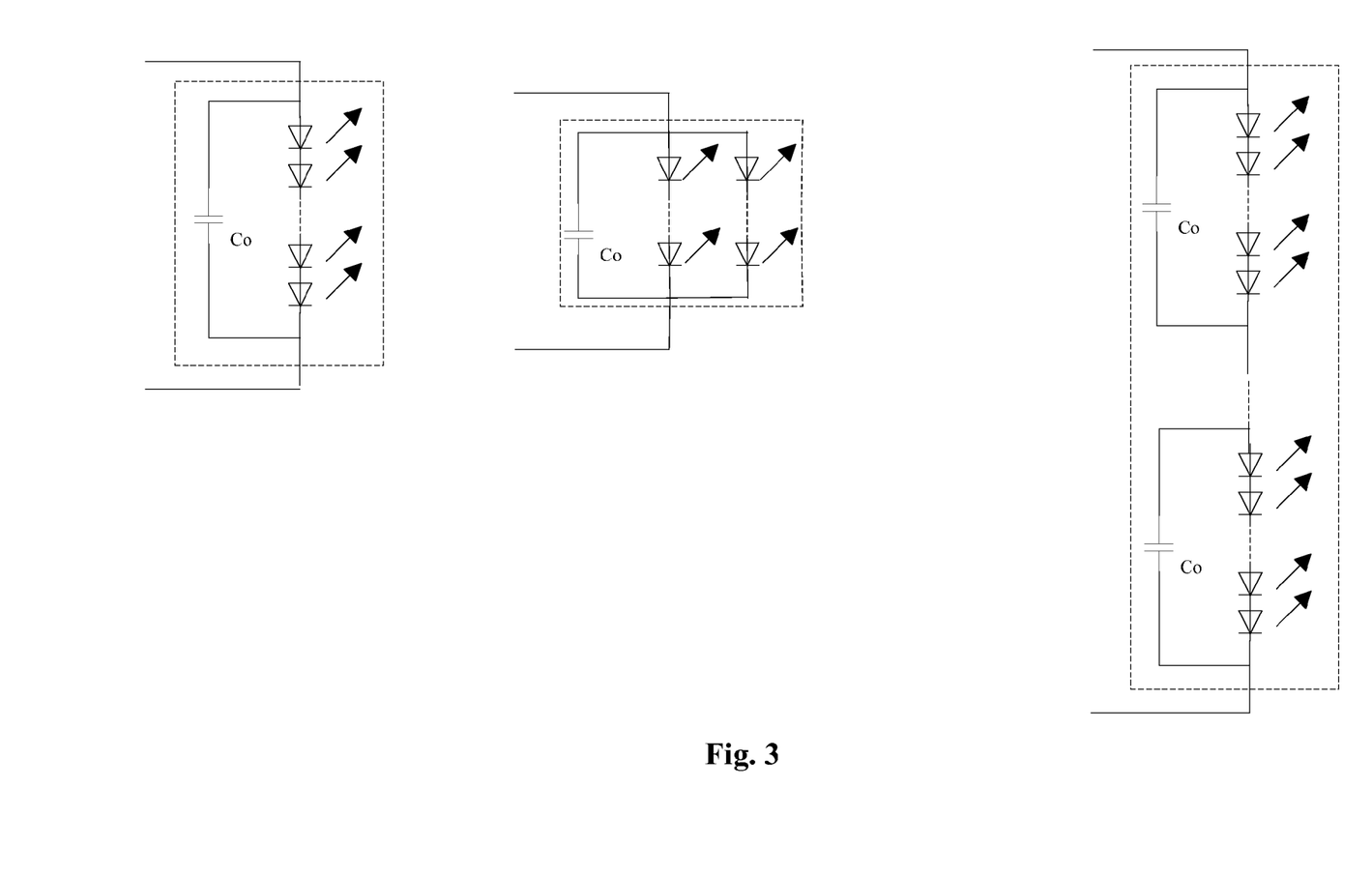
FIG. 3 illustrates a schematic diagram of various kinds of LED loads according to an embodiment of the present application.

In the present application, a LED load which is connected to an electric current source means a load comprising at least one LED. As illustrated in FIG. 3, a LED load may comprise: a plurality of LEDs connected in series, a plurality of LEDs connected in parallel after being connected in series, a plurality of LEDs connected in series after being connected in parallel, or a plurality of LEDs connected in series after being connected in series, etc. A plurality of LEDs connected in series are shown in the following drawings as an example, but not limited thereto.

Figure 4:
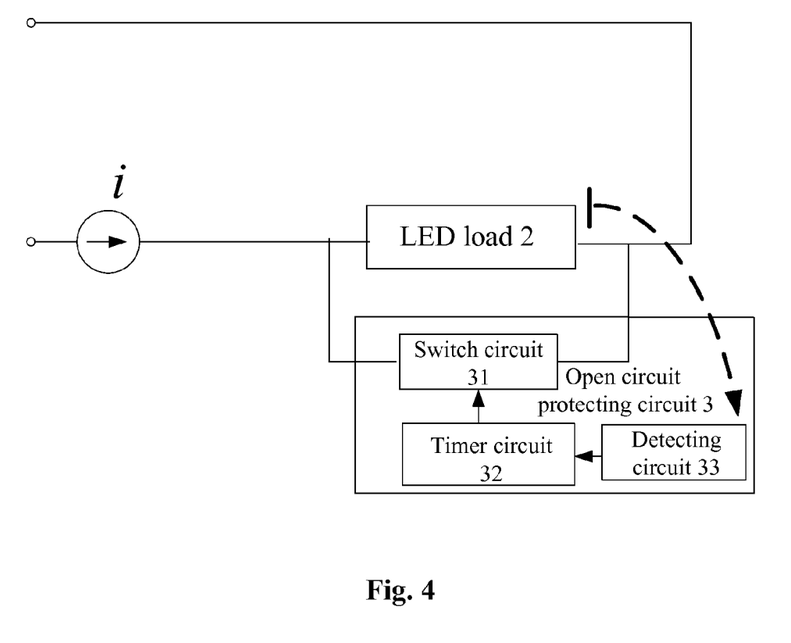
FIG. 4 illustrates a schematic diagram of an open circuit protecting circuit according to an embodiment of the present application.

FIG. 4 is a schematic diagram of an open circuit protecting circuit 3 according to an embodiment of the present application, wherein two ends of the open circuit protecting circuit 3 are connected to two ends of a LED load 2, respectively, i.e., the open circuit protecting circuit 3 is connected as a whole in parallel with the LED load 2. The open circuit protecting circuit 3 may comprise a switch circuit 31 connected in parallel to two sides of the LED load 2, a timer circuit 32 and a detecting circuit 33. As shown in FIG. 4, an electric current source i is connected to the LED load 2 to supply electric power to the LED load 2. When the LED load 2 is not open circuited, i.e., when the LED load 2 works normally, an electric current from the electric current source i passes through the LED load 2 while does not passes through the switch circuit 31. If the LED load 2 malfunctions and is open circuited accordingly (in the following, the malfunction situations in which one or some LEDs in a LED load being damaged and open circuited accordingly, the whole LED load being in poor contact with the circuit, or the LED load being not connected are all referred as the LED load being open circuited), the open circuit protecting circuit 3 carries out the following operations: the detecting circuit 33 sends an enabling signal to the timer circuit 32, the timer circuit 32 sends a driving signal with a set time to the switch circuit 31, and the switch circuit 31 is in the on-state during the set time. During the set time, the electric current passes through the switch circuit 31 instead of the LED load 2, thus the LED load 2 is short circuited, and whereby a function of circuit protection is achieved.

The switch circuit 31 is turned off after the set time elapses, and then if the open circuit state still continues, the open circuit protecting circuit 3 repeats the above operations to keep on protecting the circuit. If the LED load 2 is connected into the branch normally and is not open circuited (including the situations in which one or some LEDs of the LED load 2 have been repaired, the position of the LED load 2 which has been in poor contact with the apparatus is regulated to be re-connected into the apparatus, or the LED load 2 is connected into the branch without any LED load being connected), the detecting circuit 33 would not detect that the LED load 2 is open circuited, and the electric current source supplies electric power to the LED load 2, thus the LED load 2 resumes to normal work automatically, i.e., the LED load 2 can be provided with a function of hot-plugging.

Figure 5:
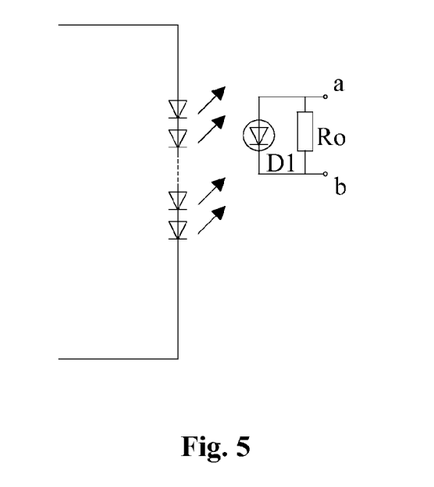
FIG. 5 illustrates a schematic diagram of a detecting circuit according to an embodiment of the present application.

It should be noticed that, as shown in FIG. 4, the dashed line connection between the LED load 2 and the detecting circuit 33 means that the detecting circuit 33 may be electrically connected to the LED load 2, and detect whether the LED load 2 is open circuited by detecting the voltage across the LED load 2; or the detecting circuit 33 may be not electrically connected to the LED load 2, for example, the detecting circuit 33 may comprise a photoconductive device (such as a photo diode, a photo transistor or a photosensitive resistor) and judge whether the LED load 2 is open circuited by detecting the light emission condition of the LED load 2. For example, as shown in FIG. 5, the detecting circuit 33 comprises a photo diode D1. If the LED load 2 is not open circuited, the light from the LED load 2 would irrigate on the photo diode D1 to generate a reverse electric current, thus a voltage that is greater than a set value may generate across two ends a and b of the detecting circuit 33; and if the LED load 2 is open circuited, there would be no light irrigating on the photo diode D1, and the voltage across the two ends a and b would not be greater than the set value. Therefore, whether to start up the timer circuit 32 can be determined by detecting the voltage across the two ends a and b, thus a function of open circuit detection can be realized without any electrical connection between the detecting circuit 33 and the LED load 2.

Wherein, the timer circuit 32 can be embodied as an analog circuit, such as a 555 timer; or can be embodied as a digital circuit, such as a timer circuit in a digital control chip. The switch circuit 31 comprises a switch device, which may be such a switch device that the turning on and off thereof is controlled by its control terminal, such as a MOSFET, an IGBT etc.

Furthermore, the timer circuit and the detecting circuit in FIG. 4 can be supplied with electric power by a common power supply or by individual power supplies.

Figure 6:
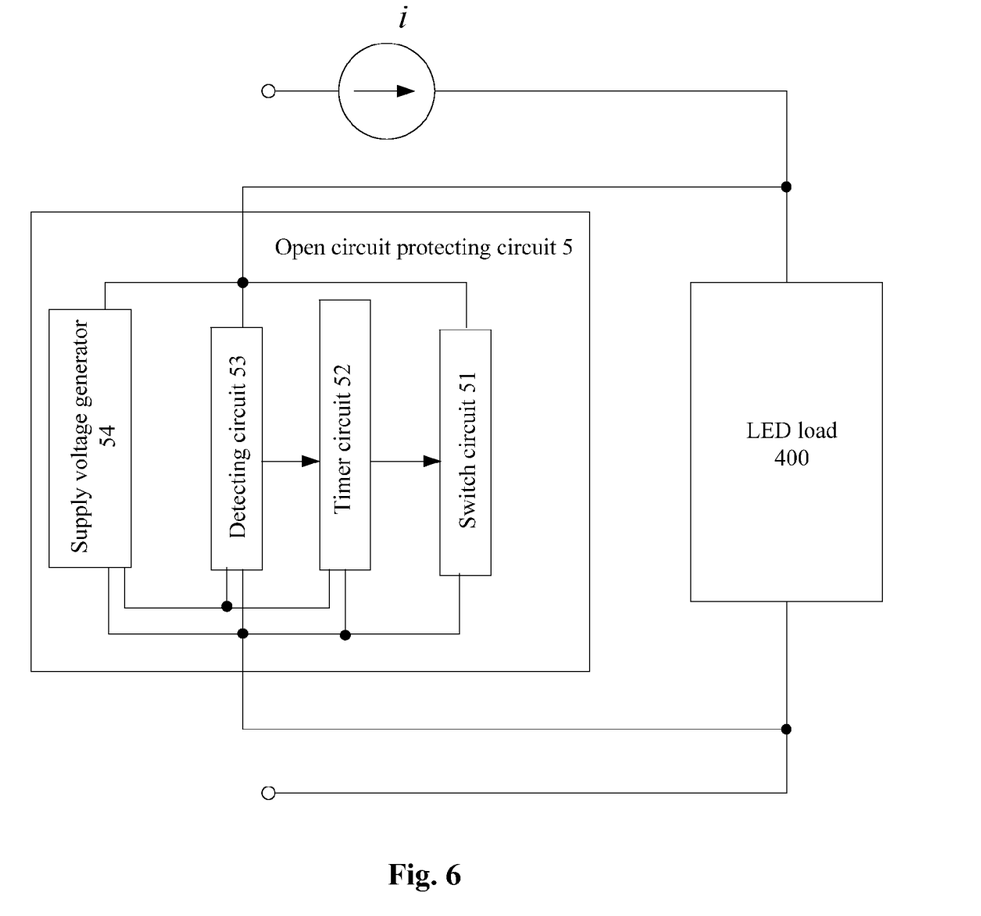
FIG. 6 illustrates a schematic diagram of an open circuit protecting circuit according to a further embodiment of the present application.

FIG. 6 is a schematic diagram of an open circuit protecting circuit 5 according to a further embodiment of the present application. As shown in FIG. 6, two ends of the open circuit protecting circuit 5 are connected to two ends of a LED load 400, respectively, i.e., the open circuit protecting circuit 5 is connected as a whole in parallel with the LED load 400. In the open circuit protecting circuit 5, the LED load 400 can be supplied with electric power by an electric current source (such as a direct electric current source i). The open circuit protecting circuit 5 may comprise four parts: a switch circuit 51, a timer circuit 52, a detecting circuit 53 and a supply voltage generator 54. The switch circuit 51 is connected to two ends of the LED load 400, the timer circuit 52 is connected to the switch circuit 51, the detecting circuit 53 is connected to the timer circuit 52, and the supply voltage generator 54 supplies to the detecting circuit 53 and the timer circuit 52 with voltage which is enough for them to work normally. According to one embodiment of the present application, the supply voltage generator 54 is connected in parallel with two ends of the LED load 400. When the LED load 400 works normally, the supply voltage generator 54 converts the voltage across the LED load 400 to a voltage which is enough for the detecting circuit 53 and the timer circuit 52 to work normally. If the LED load 400 presents an open circuit state, the following operations will be carried out: the detecting circuit 53 sends an enabling signal to the timer circuit 52, the timer circuit 52 outputs a driving signal immediately after receiving the enabling signal to drive a switch in the switch circuit 51 and the switch is in the on-state during the set time. The electric current from the electric current source i flows through the switch circuit 51 during the set time which can be set by the time circuit 52 and which can be changed according to actual engineering requirements. During the set time, the supply voltage generator 54 would keep on providing work voltage to the detecting circuit 53 and the timer circuit 52. After the set time elapses, the time circuit 52 turns off and stops outputting the driving signal, and the switch in the switch circuit 51 is turned off. If there is not any normal LED load 400 being connected into the apparatus at this time, the open circuit protecting circuit 5 would carry on the above operations repeatedly; and if a normal LED load 400 is connected into the apparatus at this time, there would not be any open circuited LED load detected by the detecting circuit 53 in the open circuit protecting circuit 5, the switch circuit 51 is turned off, the electric current passes through the normal LED load 400, i.e., the open circuit protecting circuit 5 returns to normal state.

Figure 7:
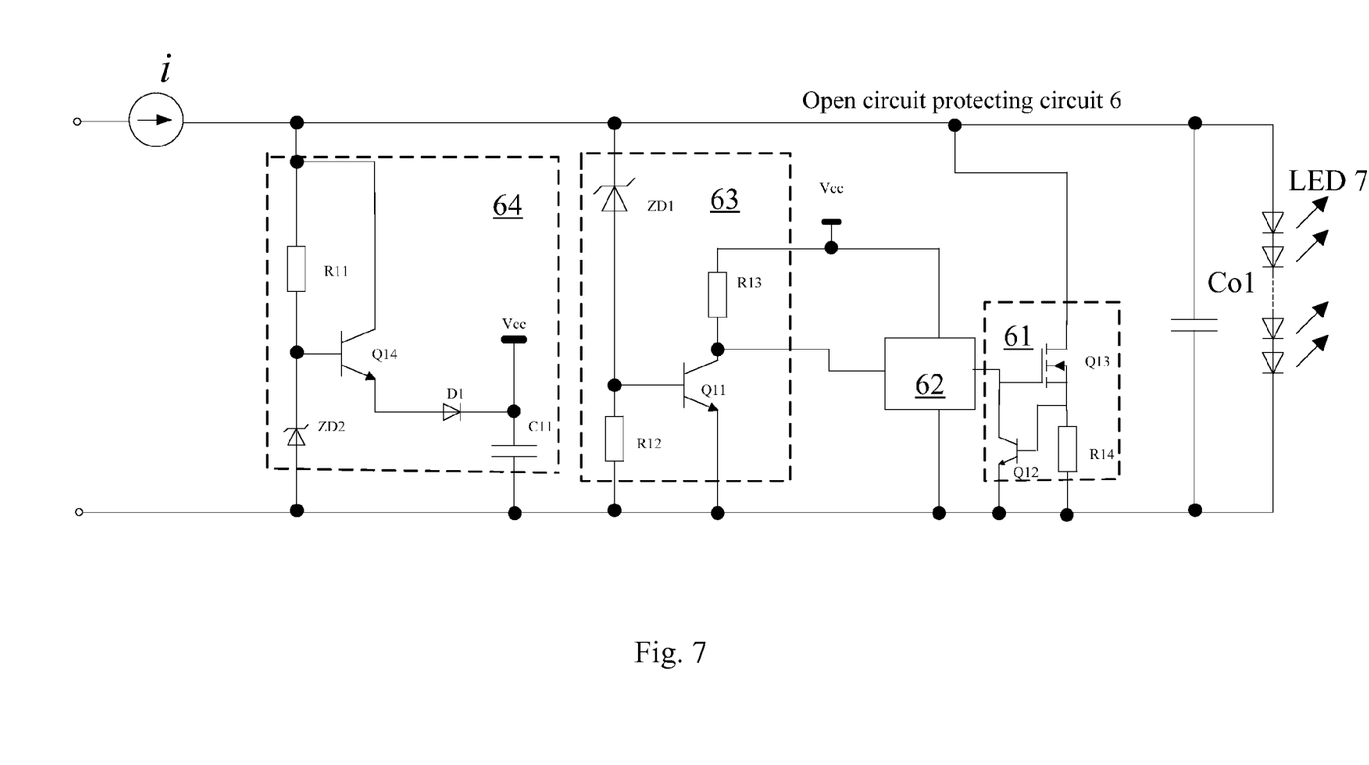
FIG. 7 illustrates a specific circuit diagram of an open circuit protecting circuit according to an embodiment of the present application.

FIG. 7 is a specific circuit diagram of an open circuit protecting circuit 6 according to an embodiment of the present application. As shown in FIG. 7, two ends of the open circuit protecting circuit 6 are connected to two ends of a LED load 7, respectively, i.e., the open circuit protecting circuit 6 is connected as a whole in parallel with the LED load 7. The open circuit protecting circuit 6 comprises four parts: a switch circuit 61, a timer circuit 62, a detecting circuit 63 and a supply voltage generator 64. The switch circuit 61, the supply voltage generator 64 and the detecting circuit 63 are connected in parallel with two ends of the LED load 7, the output end of the detecting circuit 63 is connected to the input end of the timer circuit 62, the output end of the timer circuit 62 is connected to the input end of the switch circuit 61, and the supply voltage generator 64 supplies the detecting circuit 63 and the timer circuit 62 with voltage which is enough for them to work normally. When the LED load 7 works normally, the supply voltage generator 64 convert the voltage across the LED load 7 to a voltage which is enough for the detecting circuit 63 and the timer circuit 62 to work normally. Specifically, the switch circuit 61 may comprise a Field Effect Transistor (FET) Q13, the source of the FET Q13 is connected to the cathode of the LED load 7, the gate thereof is connected to the output end of the timer circuit 62, and the drain thereof is connected to the anode of the LED load 7. The timer circuit 62 may comprise a monostable trigger constituted by a 555 timer, the input end of the 555 timer is connected to the output end of the detecting circuit 63, and the output end of the 555 timer is connected to the input end of the switch circuit 61. The detecting circuit 63 may comprise a zener diode ZD1 and a transistor Q11, the cathode of the zener diode ZD1 is connected to the anode of the LED load 7, and the anode of the zener diode ZD1 is connected to the base of the transistor Q11 and to the cathode of the LED load 7 via a resistor R12, the emitter of the transistor Q11 is connected to the cathode of the LED load 7, the collector of the transistor Q11 is connected to the input end of the timer circuit 62 and to a supply voltage Vcc via a resistor R13. The supply voltage generator 64 may comprise a zener diode ZD2, a transistor Q14, a diode D1 and a capacitor C11, an anode of the diode D1 is connected to an emitter of the transistor Q14, a cathode of the diode D1 is connected to one end of the capacitor C11, another end of the capacitor C11 is connected to the cathode of the LED load 7, a base of the transistor Q14 is connected to a cathode of the zener diode ZD2 and to the anode of the LED load 7 via a resistor R11, and a collector of the transistor Q14 is connected to the anode of the LED load, wherein the voltage across the capacitor C11 is the supply voltage Vcc.

Wherein, when the LED load 7 works normally, the voltage across the LED load 7 enables the transistor Q14 and the diode D1 to be turned on, and charges the capacitor C11 via the Q14 and the D1. A steady voltage would be obtained across the capacitor C11, and thus supplied to the detecting circuit 63 and the timer circuit 62. Also, when the LED load 7 works normally, the zener diode ZD1 is not brokedown, the Q11 is turned off, so the detecting circuit 63 detects that the LED load 7 is not open circuited.

If the LED load 7 malfunctions, the voltage across the LED load 7 is increased, the transistor Q14 and the diode D1 are still turned on at this time, and keep on charging the capacitor C11 via the Q14 and the D1, so as to supply electric power to the detecting circuit 63 and the timer circuit 62. When the voltage across the LED load 7 is greater than a reverse breakdown voltage of the zener diode ZD1, the zener diode ZD1 would be brokedown and the transistor Q11 would be turned on, so the detecting circuit 63 supplies a falling edge signal (i.e., an enabling signal) to the following 555 timer circuit, then the 555 timer circuit outputs a high-voltage driving signal with a set time to drive and turn on the FET Q13, thus the electric current of the electric current source i would flow though the FET Q13, i.e., make the LED load 7 be short circuited to realize the open circuit protection for the LED load 7. At this time, the voltage across the LED load 7 is nearly 0(zero), so the transistor Q14 and the diode D1 are turned off, the C11 can not be charged anymore, and the voltage which has been charged to the C11 takes over to supply normal working voltage to the detecting circuit 63 and the timer circuit 62. After the set time elapses, the 555 timer circuit outputs a low level signal, and the FET Q13 cuts off. If the malfunction still exists at this time, the voltage across the LED load 7 is increased again, thus the open circuit protecting circuit 6 functions the open circuit protection again for the LED load 7; if the malfunction is cleared then, the electric current source supplies electric power to the LED load 7, thus the detecting circuit 63 detects that the load is not open circuited anymore, and the switch circuit 61 is turned off and the LED load 7 returns to normal work.

Wherein, it should be pointed out that, the set time which is set by the supply voltage generator 64 and the 555 timer should be configured such that: during the time set by the 555 timer, the voltage of the Vcc should not be lower than the scope of the voltages which can maintain the 555 chip and the detecting circuit 63 to work normally. Furthermore, a filter capacitor Co1 can be added to be connected in parallel with two ends of the LED load 7 according to actual needs. Besides, during a period that the LED load 7 is open circuited and the switch circuit 61 is turned on, the voltage across the filter voltage Co1 would also be discharged via the Q13. For decreasing the noise which is brought by swift discharge of the capacitor Co1 via the switch device in the switch circuit 61 during the turn on period of the switch circuit 61, a current limiting circuit composed by a transistor Q12 and a resistor R14 may also be configured in the switch circuit 61 of the open circuit protecting circuit 6, wherein a base of the Q12 is connected to the source of the FET Q13 and one end of the resistor R14, a collector of the Q12 is connected to the output end of the timer circuit 62 and the gate of the FET Q13, and an emitter of the Q12 is connected to another end of the resistor R14 and the cathode of the LED load 7. When the voltage across the resistor R14 generated by the electric current flowing through the resistor R14 is greater than the turned on voltage of the Q12, the Q12 is turned on, thus the voltage of the 555 timer circuit is lowered, so the electric current is limited and the noise is decreased.

Besides realizing the open circuit protection when one or more LEDs is damaged, the open circuit protecting circuit of the present application can also realize the open circuit protection when many or all of the LEDs in one branch are in poor contact with the circuit or no LED is connected into the branch. Therefore, when the LED load malfunctions, there would be no large voltage which may damage the circuit, so the rest parts of the circuit would not be damaged, and the power consumption of the open circuit protecting circuit is relatively low at the same time.

The circuit in FIG. 7 is not an exclusive embodied manner, the supply voltage generator 64 can be embodied as a DC-DC converter module, such as a Buck, a Boost or other topology converters with the same characteristic; the timer circuit 62 can be embodied as a counter in a digital control chip; and an IGBT or other switch devices may be configured in the switch of the switch circuit 61. Those skilled in the art may make many kinds of variations based on the circuit shown in FIG. 7 according to the content disclosed in the present application.

Figure 8:
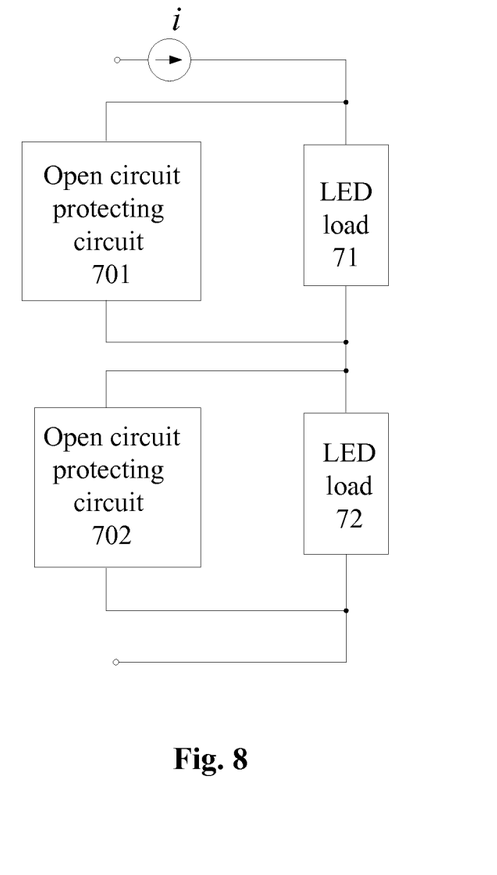
FIG. 8 illustrates an illuminating apparatus according to an embodiment of the present application.

FIG. 8 is an illuminating apparatus according to an embodiment of the present application. As shown in FIG. 8, an electric current source i supplies electric power to series-connected LED loads 71 and 72, the LED loads 71 and 72 are connected in parallel with open circuit protecting circuits 701 and 702 disclosed in the present application, respectively. When one of the LED loads malfunctions and is open circuited accordingly, the open circuit protecting circuit connected in parallel therewith would make the open circuited LED load be short circuited and realize open circuit protection thereon, and another load can still keep on working. Also, after the open circuit malfunction of the LED load is cleared, the branch of the LED load can resume to normal work automatically, and thus a hot-plugging function can be provided. Wherein, the number of the LED loads and the open circuit protecting circuits are not limited to two, but can be of any number.

Figure 9:
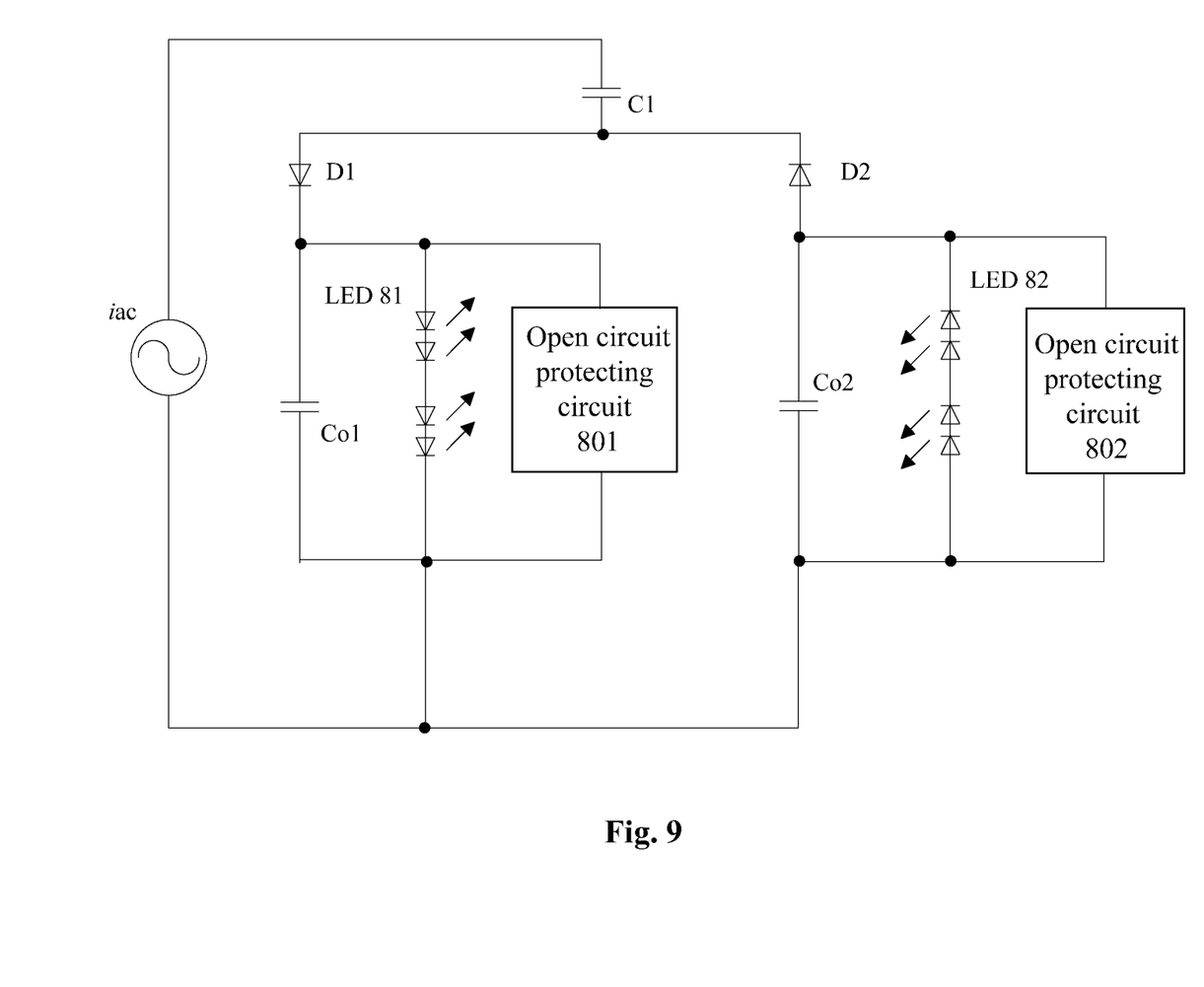
FIG. 9 illustrates an illuminating apparatus according to an embodiment of the present application.

FIG. 9 is an illuminating apparatus according to an embodiment of the present application. In the illuminating apparatus, an AC electric current source iac supplies electric power to a first branch of LED load 81 and a second branch of LED load 82, the AC electric current source iac has a first end and a second end. The illuminating apparatus comprises: the LED 81 with a first anode and a first cathode, the first cathode is connected to the second end of the AC electric current source iac; the LED 82 with a second anode and a second cathode, the second anode is connected to the second end of the AC electric current source iac; a first open circuit protecting circuit 801 connected in parallel with the LED load 81; a second open circuit protecting circuit 802 connected in parallel with the LED load 82; a first current equalizing capacitor C1 with a first capacitor end and a second capacitor end, the first capacitor end is connected to the first end of the AC electric current source iac, and a DC electric current component is filtered out from the AC electric current source iac by the current equalizing capacitor C1 to realize current equalization on the AC electric current; a first rectifier diode D1 with a first rectifier anode and a first rectifier cathode, the first rectifier cathode is connected to the first anode of the LED load 81, and the first rectifier anode is connected to the second capacitor end; and a second rectifier diode D2 with a second rectifier anode and a second rectifier cathode, the second rectifier anode is connected to the second cathode of the LED load 82, and the second rectifier cathode is connected to the second capacitor end, thus a current rectifying effect can be achieved by the first rectifier diode D1 and the second rectifier diode D2, which make the LED 81 work during a positive half cycle of the AC electric current source iac, and make the LED 82 work during a negative half cycle of the AC electric current source iac, so as to realize time sharing function on the AC electric current. The illuminating apparatus may or may not comprise the AC electric current source iac. When one of the LED loads malfunctions and is open circuited accordingly, the open circuit protecting circuit connected in parallel therewith would make the open circuited LED load be short circuited and realize open circuit protection thereon, and another load can keep on working. Also, after the open circuit malfunction of the LED load is cleared, the branch of LED load can resume to normal work automatically, and thus a hot-plugging function can be realized.

Figure 10:
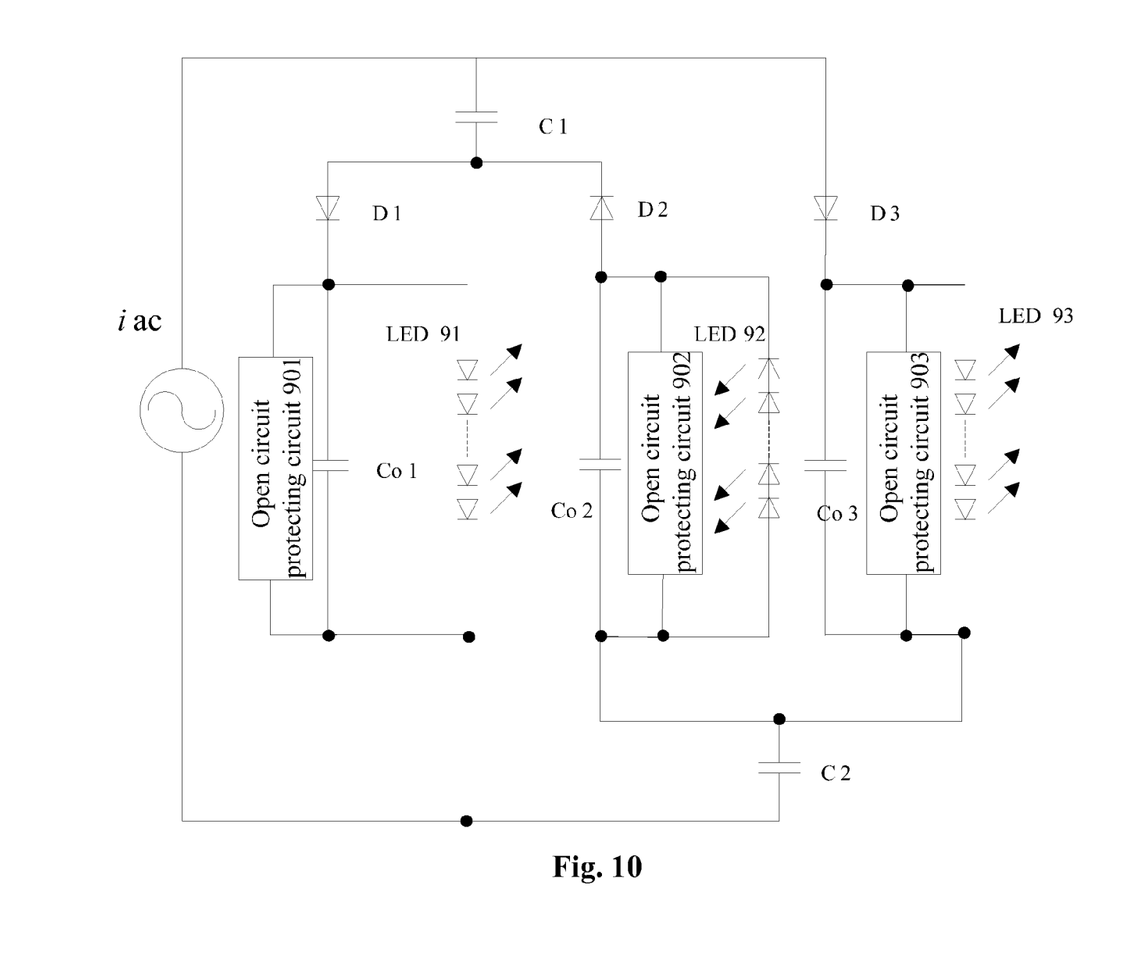
FIG. 10 illustrates an illuminating apparatus according to an embodiment of the present application.
Figure 11:
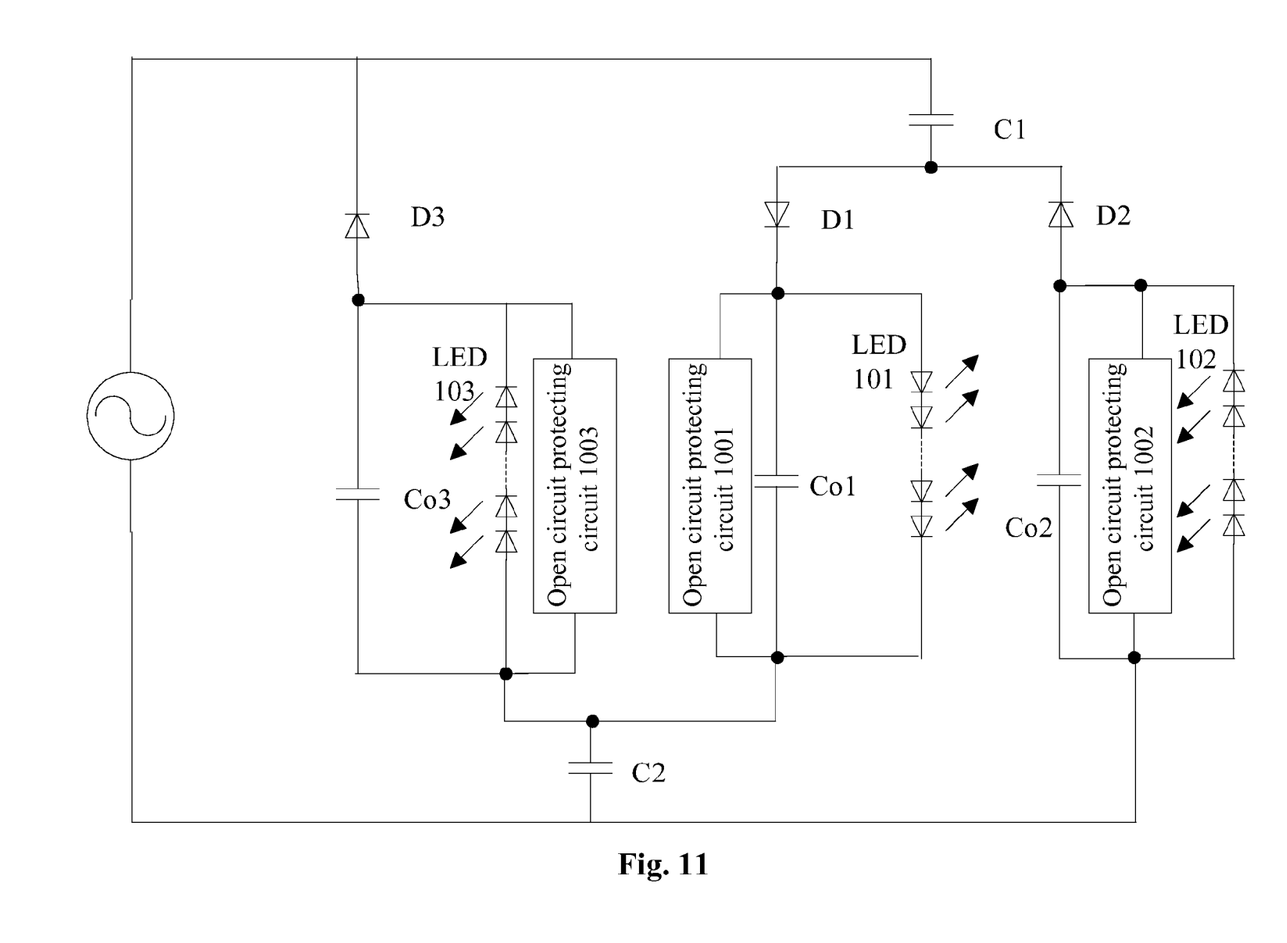
FIG. 11 illustrates an illuminating apparatus according to an embodiment of the present application.
Figure 12:
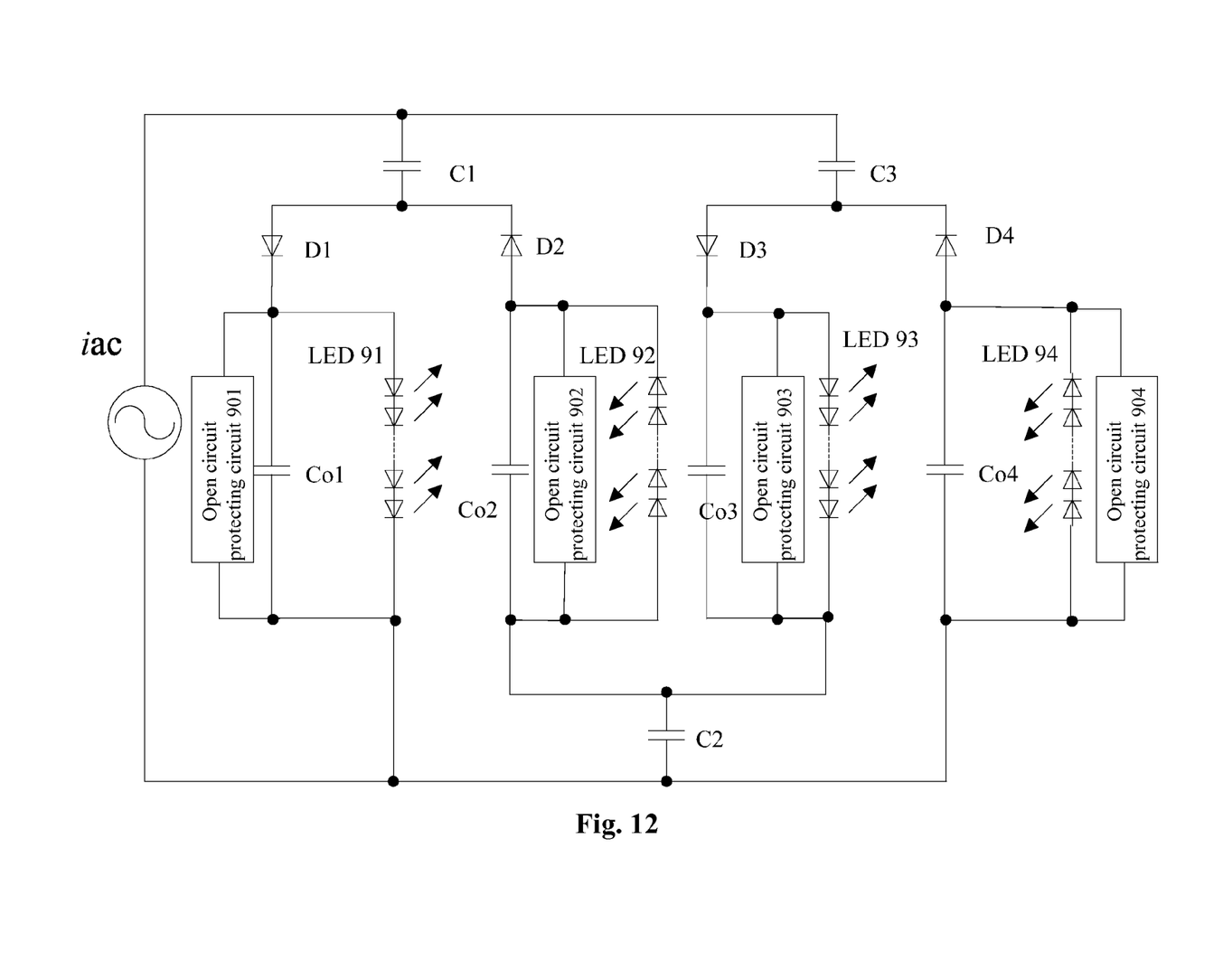
FIG. 12 illustrates an illuminating apparatus according to an embodiment of the present application.

This kind of illuminating apparatus is not limited to two branches of LED loads as shown in FIG. 9, but can comprise any number of branches of LED loads, such as three branches of LED loads as shown in FIGS. 10 and 11 or four branches of LED loads as shown in FIG. 12.

Referring to FIG. 10 and FIG. 11, besides the elements shown in FIG. 9, the illuminating apparatus may also comprise a third branch of LED load, it can work during a positive half cycle of the AC electric current source iac in a same way as LED 91, or work during a negative half cycle of the AC electric current source iac in a same way as LED 92. For the illuminating apparatus according to the embodiment of the present application shown in FIG. 10, besides the elements shown in FIG. 9, the illuminating apparatus may also comprise: a LED 93 with a third anode and a third cathode; a third open circuit protecting circuit 903 connected in parallel with the LED load 93; a second current equalizing capacitor C2 with a third capacitor end and a fourth capacitor end, the third capacitor end is connected to the second anode of the LED load 92 and the third cathode of the LED load 93, and the fourth capacitor end is connected to the second end of the AC electric current source iac, a DC electric current component is filtered out from the AC electric current source iac by the current equalizing capacitor C2 to realize current equalization on the AC electric current, i.e., the LED 91, the LED 92 and the LED 93 are provided with an effect of current equalization on the AC electric current by C1 and C2, respectively; and a third rectifier diode D3 with a third rectifier anode and a third rectifier cathode, the third rectifier anode is connected to the first end of the AC electric current source iac, and the third rectifier cathode is connected to the third anode of the LED load 93, so the third rectifier diode D3 is provided with a function of current rectifying, which makes the LED 93 work during the positive half cycle of the AC electric current source iac and realizes time sharing on the AC electric current. When one of the LED loads malfunctions and is open circuited accordingly, the open circuit protecting circuit connected in parallel therewith would make the open circuited LED load be short circuited and realize open circuit protection thereon, and other loads can still keep on working. Also, after the open circuit malfunction of the LED load is cleared, the branch of LED load can resume to normal work automatically, and thus a hot-plugging function can be realized.

For an illuminating apparatus shown in FIG. 11, besides the elements shown in FIG. 9, the illuminating apparatus may also comprise: a LED 103 with a third anode and a third cathode; a third open circuit protecting circuit 1003 connected in parallel with the LED load 103; a second current equalizing capacitor C2 with a third capacitor end and a fourth capacitor end, the third capacitor end is connected to the first cathode of the LED load 101 and the third anode of the LED load 103, and the fourth capacitor end is connected to the second end of the AC electric current source iac, a DC electric current component is filtered out from the AC electric current source iac by the current equalizing capacitor C2 to realize current equalization on the AC electric current, i.e., the LED 101, the LED 102 and the LED 103 are provided with an effect of current equalization on the AC electric current by C1 and C2, respectively; and a third rectifier diode D3 with a third rectifier anode and a third rectifier cathode, the third rectifier cathode is connected to the first end of the AC electric current source iac, and the third rectifier anode is connected to the third cathode of the LED load 103, so the third rectifier diode D3 is provided with a function of current rectifying, which makes the LED 103 work during the negative half cycle of the AC electric current source iac and realizes time sharing on the AC electric current. When one of the LED loads malfunctions and is open circuited accordingly, the open circuit protecting circuit connected in parallel therewith would make the open circuited LED load be short circuited and realize open circuit protection thereon, while other loads can still keep on working. Also, after the open circuit malfunction of the LED load is cleared, the branch of LED load can resume to normal work automatically, and thus a hot-plugging function can be realized.

Besides the elements shown in FIG. 10 and FIG. 11, the illuminating apparatus may further comprise a fourth branch of LED load 94, when the third branch of LED load 93 works during the positive half cycle of the AC electric current source iac, the fourth branch of LED load 94 works during the negative half cycle of the AC electric current source iac; similarly, when the third branch of LED load 93 works during the negative half cycle of the AC electric current source iac, the fourth branch of LED load 94 works during the positive half cycle of the AC electric current source iac. As shown in FIG. 12, in an illuminating apparatus according to an embodiment of the present application, the LED load 93 works during the positive half cycle of the AC electric current source iac, and the fourth branch of LED load 94 works during the negative half cycle of the AC electric current source iac, the connection relationship between the LED 93, and the third rectifier diode D3 and the third open circuit protecting circuit 903 is similarly as that between the LED 91, the first rectifier diode D1 and the first open circuit protecting circuit 901, and the connection relationship between the LED 94, and the fourth rectifier diode D4 and the fourth open circuit protecting circuit 904 is similarly as that between LED 92, the second rectifier diode D2 and the second open circuit protecting circuit 902. The illuminating apparatus according to an embodiment of the present application further comprises a third current equalizing capacitor C3 with a fifth capacitor end and a sixth capacitor end, the fifth capacitor is connected to the first end of the AC electric current source iac, and the sixth capacitor end is connected to the third rectifier anode of the third rectifier diode D3 and the fourth rectifier cathode of the fourth rectifier diode D4, a DC electric current component is filtered out from the AC electric current source iac by the current equalizing capacitor C3 to realize current equalization on the AC electric current, i.e., the LED 101, the LED 102, the LED 103 and the LED 104 are provided with an effect of current equalization on the AC electric current by C1, C2 and C3, respectively. When one of the LED loads malfunctions and is open circuited accordingly, the open circuit protecting circuit connected in parallel therewith would make the open circuited LED load be short circuited and realize open circuit protection thereon, while other loads can still keep on working. Also, after the open circuit malfunction of the LED load is cleared, the branch of LED load can resume to normal work automatically, and thus a hot-plugging function can be realized.

In the illuminating apparatus shown in FIG. 8 to FIG. 12, the electric current source may be included or not.

In the present application, the apparatus including the open circuit protecting circuit and the LED load may be an illuminating apparatus, such as a common illuminating apparatus, a display apparatus or other apparatus.

In the present application, an AC electric current source or a DC electric current source may be chosen according to actual needs, without any limitation to one kind of electric current source.

Figure 13:
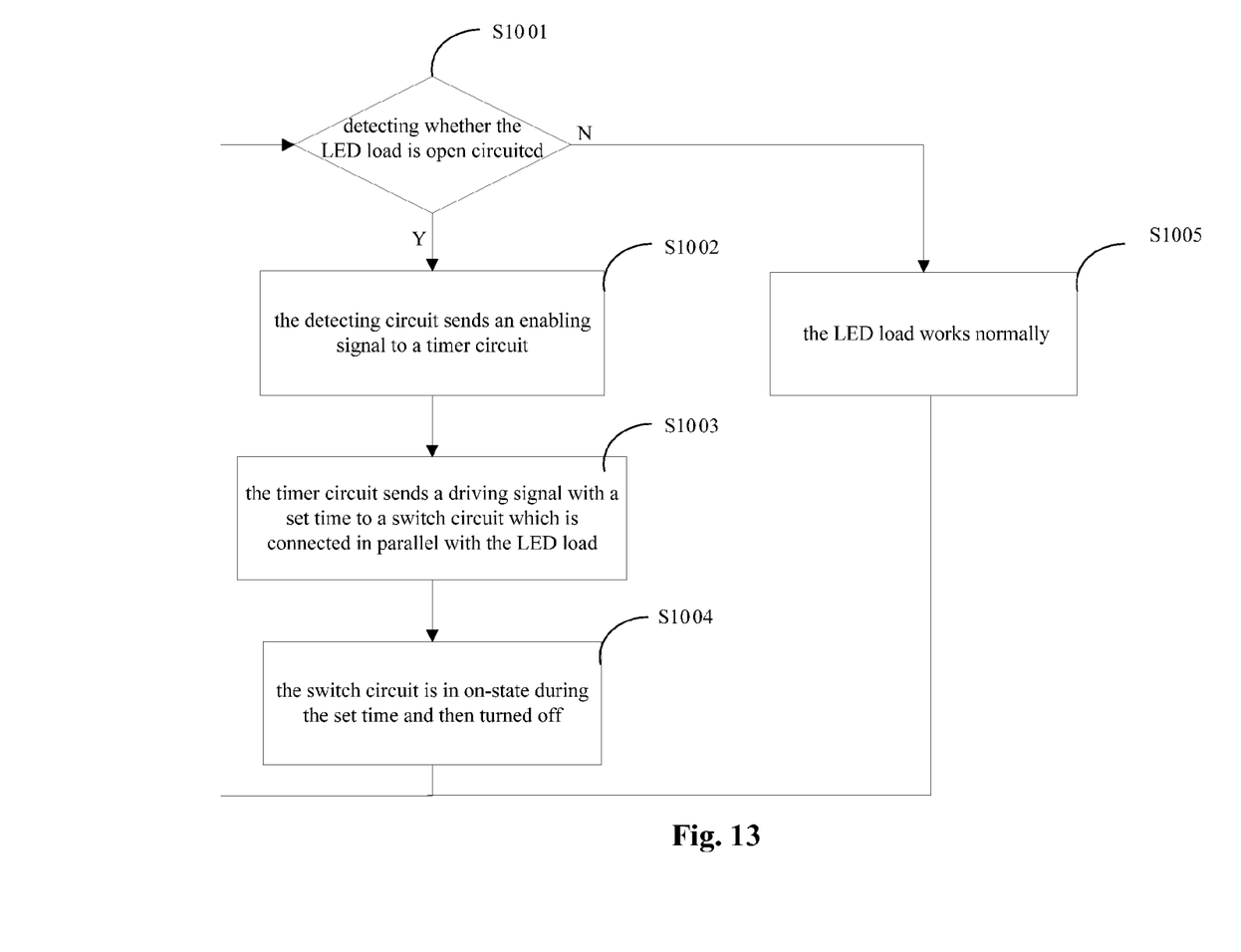
FIG. 13 illustrates a flow diagram of an open circuit protecting method according to an embodiment.

FIG. 13 is a flow diagram according to an open circuit protecting method of an embodiment. An open circuit protecting method of LED load may comprise: firstly, in step S1001, a detecting circuit detects whether a LED load is open circuited, if the LED load is detected to be not open circuited, then proceed to step S1005, wherein the LED load works normally, and then proceed to step S1001, wherein the detecting circuit detects whether the LED load is open circuited. If the LED load is detected to be open circuited, then proceed to step S1002, wherein the detecting circuit sends an enabling signal to a timer circuit; then proceed to step S1003, wherein the timer circuit sends a driving signal with a set time to a switch circuit connected in parallel with the LED load; then proceed to step S1004, wherein the switch circuit is in the on-state during the set time, the switch circuit is turned off after the set time elapses, and then proceed back to the step S1001 to detect whether the LED load is open circuited, if it is detected that the open circuited malfunction of the LED load is cleared, then proceed to step S1005; if it is detected that the open circuit state of the LED load still continues after the set time elapses, then repeats the operations of S1002-S1004 to keep on protecting the circuit.

While the invention has been described in connection with several typical embodiments, it should be understood that the terms used herein is illustrative and exemplary, and is not intended as limiting. Since the present invention may be implemented in various forms without departing the concept and spirit of the present invention, the embodiments mentioned above are not limited to the details set forth herein, and should be contemplated broadly according to the concept and spirit defined by the claims. Therefore, the claims intend to cover all modifications and variations which fall within the following claims and equivalents thereto.

What is claimed is:

1. An open circuit protecting circuit, which is configured in an apparatus with a LED load being supplied with electric power by an electric current source, comprising:
    a switch circuit, connected in parallel with two sides of the LED load;
    a timer circuit, connected to the switch circuit; and
    a detecting circuit, connected to the timer circuit and configured for detecting whether the LED load is open circuited;
    wherein if the LED load malfunctions and is open circuited, the open circuit protecting circuit carries out following operations: the detecting circuit sends an enabling signal to the timer circuit; the timer circuit sends a driving signal with a set time to the switch circuit; and the switch circuit is in the on-state during the set time, so that the LED load is configured to be short circuited;
    wherein the switch circuit comprises a switch device which is turned on or turned off by a control terminal of the switch device,
    when the LED load is normally connected into the apparatus, the switch device is turned off and the LED load keeps on working normally; and
    when the LED load is open circuited, the switch device receives the driving signal with the set time and is turned on accordingly, so as to make the LED load be short circuited during the set time.

2. The open circuit protecting circuit of claim 1, wherein the switch circuit is turned off after the set time elapses, and then:
    if the detecting circuit detects that the LED load is still open circuited, the open circuit protecting circuit repeats the above operations; or
    if the detecting circuit detects that the malfunction of the LED load is cleared, the LED load resumes to work automatically.

3. The open circuit protecting circuit of claim 1, wherein:
    the detecting circuit is electrically connected to the LED load, and detects whether the LED load is open circuited by detecting the voltage across the LED load; or
    the detecting circuit comprises a photoconductive device, which detects whether the LED load is open circuited by detecting an light emission condition of the LED load.

4. The open circuit protecting circuit of claim 1, further comprising a supply voltage generator, which is connected in parallel with the LED load and supplies electric power to the detecting circuit and the timer circuit.

5. The open circuit protecting circuit of claim 4, wherein the supply voltage generator is a DC-DC converter.

6. The open circuit protecting circuit of claim 1, wherein the timer circuit is a 555-type circuit or a counter circuit in a digital control chip.

7. The open circuit protecting circuit of claim 1, wherein the switch circuit comprises a current-limiting circuit coupled to the switch device, so as to decrease noise.

8. An illuminating apparatus, comprising:
    the open circuit protecting circuit of claim 1; and
    the LED load,
    wherein the open circuit protecting circuit is connected in parallel with two ends of the LED load.

9. The illuminating apparatus of claim 8, further comprising an electric current source, the electric current source is connected to the LED load to supply electric power to the LED load.

10. An illuminating apparatus, comprising:
a plurality of open circuit protecting circuits of claim 1; and
a plurality of LED loads connected in series,
wherein two ends of each of the LED load are connected in parallel with one of the open circuit protecting circuits.

11. The illuminating apparatus of claim 10, further comprising an electric current source, the electric current source is connected to the LED loads to supply electric power to the LED loads.

12. An illuminating apparatus, comprising:
a first branch of LED load with a first anode and a first cathode;
a second branch of LED load with a second anode and a second cathode, wherein the first and the second branches of LED load are supplied with electric power by an AC electric current source with a first end and a second end, the first cathode and the second anode are connected to the second end of the AC electric current source, the first branch of LED load works during a positive half-period of the AC electric current source, and the second branch of LED load works during a negative half-period of the AC electric current source;
an open circuit protecting circuit of claim 1 which is configured as a first open circuit protecting circuit, the first open circuit protecting circuit being connected in parallel with the first branch of LED load;
an open circuit protecting circuit of claim 1 which is configured as a second open circuit protecting circuit, the second open circuit protecting circuit being connected in parallel with the second branch of LED load;
a first current equalizing capacitor with a first capacitor end and a second capacitor end, the first capacitor end being connected to the first end of the AC electric current source;
a first rectifier diode with a first rectifier anode and a first rectifier cathode, the first rectifier cathode being connected to the first anode of the first branch of LED load, and the first rectifier anode being connected to the second capacitor end; and
a second rectifier diode with a second rectifier anode and a second rectifier cathode, the second rectifier anode being connected to the second cathode of the second branch of LED load, and the second rectifier cathode being connected to the second capacitor end.

13. The illuminating apparatus of claim 12, further comprising:
a third branch of LED load with a third anode and a third cathode, the third branch of LED load being supplied with electric power by the AC electric current source and working during the positive half-period of the AC electric current source;
an open circuit protecting circuit of claim 1 which is configured as a third open circuit protecting circuit, the third open circuit protecting circuit being connected in parallel with the third branch of LED load;
a second current equalizing capacitor with a third capacitor end and a fourth capacitor end, the third capacitor end being connected to the second anode of the second branch of LED load and the third cathode of the third branch of LED load, and the fourth capacitor end being connected to the second end of the AC electric current source; and
a third rectifier diode with a third rectifier anode and a third rectifier cathode, the third rectifier anode being connected to the first end of the AC electric current source, and the third rectifier cathode being connected to the third anode of the third branch of LED load.

14. The illuminating apparatus of claim 12, further comprising:
a third branch of LED load with a third anode and a third cathode, the third branch of LED load being supplied with electric power by the AC electric current source and working during the negative half-period of the AC electric current source;
an open circuit protecting circuit of claim 1 which is configured as a third open circuit protecting circuit, and the third open circuit protecting circuit being connected in parallel with the third branch of the LED load;
a second current equalizing capacitor with a third capacitor end and a fourth capacitor end, the third capacitor end being connected to the first cathode of the first branch of LED load and the third anode of the third branch of LED load, and the fourth capacitor end being connected to the second end of the AC electric current source; and
a third rectifier diode with a third rectifier anode and a third rectifier cathode, the third rectifier anode being connected to the third cathode of the third branch of LED load, and the third rectifier cathode being connected to the first end of the AC electric current source.

15. The illuminating apparatus of claim 12, further comprising:
a third branch of LED load with a third anode and a third cathode, the third branch of LED load being supplied with electric power by the AC electric current source and working during the positive half-period of the AC electric current source;
a fourth branch of LED load with a fourth anode and a fourth cathode, the fourth anode being connected to the second end of the AC electric current source, and the fourth branch of LED load being supplied with electric power by the AC electric current source and working during the negative half-period of the AC electric current source;
an open circuit protecting circuit of claim 1 which is configured as a third open circuit protecting circuit, and the third open circuit protecting circuit being connected in parallel with the third branch of the LED load;
an open circuit protecting circuit of claim 1 which is configured as a fourth open circuit protecting circuit, and the fourth open circuit protecting circuit being connected in parallel with the fourth branch of the LED load;
a second current equalizing capacitor with a third capacitor end and a fourth capacitor end, the third capacitor end being connected to the second anode of the second branch of LED load and the third cathode of the third branch of LED load, and the fourth capacitor end being connected to the second end of the AC electric current source;
a third current equalizing capacitor with a fifth capacitor end and a sixth capacitor end, the fifth capacitor being connected to the first end of the AC electric current source;
a third rectifier diode with a third rectifier anode and a third rectifier cathode, the third rectifier cathode being connected to the third anode of the third branch of LED load, and the third rectifier anode being connected to the sixth capacitor end; and
a fourth rectifier diode with a fourth rectifier anode and a fourth rectifier cathode, the fourth rectifier anode being connected to the fourth cathode of the fourth branch of LED load, and the fourth rectifier cathode being connected to the sixth capacitor end.

16. The illuminating apparatus of claim 12, further comprising the AC electric current source.

17. An open circuit protecting method for a LED load, comprising operations of:

detecting by a detecting circuit whether the LED load is open circuited;

when it is detected that the LED load malfunctions and is open circuited accordingly, sending an enabling signal to a timer circuit by the detecting circuit;

sending by the timer circuit a driving signal with a set time to a switch circuit which is connected in parallel with the LED load; and the switch circuit being in the on-state during the set time, so as to make the LED load short circuited;

wherein the method further comprises:

the switch circuit being turned off after the set time elapses, and repeating the above operations if the LED load is still open circuited; and the LED load resuming to work automatically if the malfunction of the LED load is cleared.

* * * * *